US012704835B2

(12) United States Patent
Flauzino Chaves

(10) Patent No.: US 12,704,835 B2
(45) Date of Patent: Aug. 11, 2026

(54) METHOD FOR CONTROLLING A PLANT OF SEPARATION AND TREATMENT INDUSTRIAL PROCESSES WITHOUT CHEMICAL REACTION

(71) Applicant: PETRÓLEO BRASILEIRO S.A.—PETROBRAS, Rio de Janeiro (BR)

(72) Inventor: Jose Andersands Flauzino Chaves, Japaratuba (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 391 days.

(21) Appl. No.: 18/348,947

(22) Filed: Jul. 7, 2023

(65) Prior Publication Data

US 2024/0077860 A1 Mar. 7, 2024

(30) Foreign Application Priority Data

Jul. 8, 2022 (BR) ...................... 10 2022 013652 1

(51) Int. Cl.
*G05B 19/418* (2006.01)

(52) U.S. Cl.
CPC .................. *G05B 19/41885* (2013.01); *G05B 2219/32335* (2013.01)

(58) Field of Classification Search
None
See application file for complete search history.

(56) References Cited

U.S. PATENT DOCUMENTS

| | | | | |
|---|---|---|---|---|
| 5,813,798 | A * | 9/1998 | Whiffen | B09C 1/002 405/52 |
| 6,260,004 | B1 * | 7/2001 | Hays | F04D 15/0088 702/183 |
| 6,757,579 | B1 * | 6/2004 | Pasadyn | G05B 13/04 700/52 |
| 9,008,807 | B2 | 4/2015 | Shapiro et al. | |
| 2007/0016389 | A1 | 1/2007 | Ozgen | |
| 2017/0293835 | A1 | 10/2017 | AlAjmi | |

(Continued)

FOREIGN PATENT DOCUMENTS

WO WO 14/160464 10/2014

OTHER PUBLICATIONS

Chaves et al., Jul. 1, 2024, Modeling, simulation and control of shell and tube heat exchanger of Brazilian pre-sal FPSO, https://doi.org/10.22533/at.ed.26424180710, 18 pp.

(Continued)

*Primary Examiner* — Carlos R Ortiz Rodriguez
(74) *Attorney, Agent, or Firm* — Knobbe, Martens, Olson & Bear, LLP

(57) ABSTRACT

The present invention refers to a method for controlling a plant of separation and treatment industrial processes without chemical reaction using artificial intelligence and machine learning, aiming at improving revenues and profits obtained, as well as the performance of the system, and the technique can be applied in steps of conceptual design for a unit in operation, comprising the steps of: defining objectives and gains of the plant; delimiting the plant; evaluation in steady state of the plant; evaluation in dynamic state of the plant; and performing non-linear dynamic simulation of the plant.

9 Claims, 9 Drawing Sheets

(56) References Cited

U.S. PATENT DOCUMENTS

| | | | |
|---|---|---|---|
| 2020/0065677 | A1 | 2/2020 | Iriarte Lopez |
| 2022/0003071 | A1 | 1/2022 | Ahmari |
| 2023/0235644 | A1 | 7/2023 | Martin |
| 2024/0053773 | A1 | 2/2024 | Chaves |
| 2024/0076953 | A1 | 3/2024 | Trifol |

OTHER PUBLICATIONS

Godoy, 2017, Plantwide control: a review and proposal of an augmented hierarchical plantwide control design technique, PhD Thesis, University of Sao Paolo, 219 pp.

Lele, Dec. 12, 2019, Oil-well Flow-Rate Forecasting Using Auto-Regressive Model, Lele, Shreyas, Oil-well Flow-Rate Forecasting Using Auto-Regressive Model, https://ssrn.com/abstract=3502754, 5 pp.

Luyben, 2002, Plantwide Dynamic Simulators in Chemical Processing and Control. CRC Press (TOC).

Nunes et al., 2010, Modelagem e controle da produção de petróleo: aplicações em Matlab (Modeling and control in oil production: application in Matlab), Edgard Blucher Ltd. Ed. (TOC).

Skogestad, 2004, Control structure design for complete chemical plants, Computers and Chemical Engineering, 28(1-2):219-234.

* cited by examiner

METHOD FOR CONTROLLING A PLANT OF SEPARATION AND TREATMENT INDUSTRIAL PROCESSES WITHOUT CHEMICAL REACTION

FIELD OF THE INVENTION

The present invention pertains to the technical field of control of industrial processes of separation and treatment without chemical reaction.

More specifically, the present invention relates to a method for industrial plant control, particularly, a method for controlling a plant of separation and treatment industrial processes without chemical reaction using artificial intelligence and machine learning.

BACKGROUNDS OF THE INVENTION

The integral control of an industrial plant can be performed control loop by control loop or from the analysis of the set of control loops.

The way in which the loops of the set of control loops can interact with each other and which configurations can be used in order to propose an integrated control strategy that is capable of providing improvements in relation to the loop-by-loop operation, in a multivariate system, is achieved through Plantwide Control (PWC).

There are several ways of organizing the control arrangement in order to obtain an optimal configuration. Some points must be analyzed, such as: the recycle ratio, the override control and the amplitude of the variations, as well as the design, which is an important factor and that enables the analysis of the necessary arrangements for the optimization, as exposed by Luyben, W. *Plantwide dynamic simulators in chemical processing and control*. CRC Press, 2002.

An example of a Plantwide control scheme is proposed by Skogestad. S. *Control structure design for complete chemical plants, computers and chemical engineering*, n. 1-2, v. 28, p. 219-234, 2004, which can be applied to chemical processes in general, with an objective function based on cost minimization. However, the objective function used in said scheme does not consider an increase in plant production to obtain greater revenue and profit. In this sense, the objective function based on cost minimization does not present advantages in relation to an objective such as increasing productivity. This is due to the fact that, in industries that produce high added value products, with processes that have a greater weight in fixed costs in relation to the total cost, the revenue from the sale of products becomes more important than the additional costs to obtain the same, with fixed costs being more representative than variable costs, because, when there is an increase in production, there is a way to increase profit, in a more preponderant way than the variable costs to obtain the same.

Among the various Plantwide control schemes present in the state of the art, it is observed that artificial intelligence and machine learning tools are not used as a basis for optimizing the control process. Additionally, there is not observed the use of advanced and multivariate control techniques as a way to gain stability of the loops and concatenating them in order to avoid unwanted shutdowns of the industrial plant system.

Consequently, there is a need for a method for controlling a plant of separation and treatment industrial processes without chemical reaction, maximizing the productivity of the process and using artificial intelligence and machine learning tools, from a procedure that aims at increasing the revenues and profits obtained.

STATE OF THE ART

In the state of the art, there are methods for controlling industrial plants with cost reduction bias and using local objective function.

The method proposed by Godoy, R. *Plantwide control: a review and proposal of an augmented hierarchical plantwide control design technique*, addresses to a technique for multi-objective optimization based on PWC for integrated control structure selection and controller adjustment. In addition, it discloses the use of local objective function to reduce costs. The method proposed by Godoy does not foresee the use of artificial intelligence or machine learning as a way to maximize results, the use of advanced control techniques or a genetic algorithm to optimize the objective function to maximize the plant result.

In turn, document U.S. Pat. No. 9,008,807B2 describes a method and an advanced process control system for industrial plants, based on the automation of the coefficients, parameters and functions used by controllers. However, such a document does not use the focus of optimizing the production and economic condition of the plant in relation to its revenue or profit or the use of artificial intelligence, machine learning for this purpose, advanced control techniques or a genetic algorithm for optimization of the objective function to maximize the plant results.

As can be noted from the description of the documents of the state of the art indicated above, the documents are silent regarding plant control of separation and treatment industrial processes without chemical reaction, which use artificial intelligence techniques, machine learning, genetic algorithm and objective function of maximizing the result of the plant.

BRIEF DESCRIPTION OF THE INVENTION

The present invention defines, according to a preferred embodiment, a method for controlling a plant of separation and treatment industrial processes without chemical reaction, comprising the steps of: defining objectives and gains of the plant; delimiting the plant; evaluation in steady state of the plant; evaluation in dynamic state of the plant; and performing non-linear dynamic simulation of the plant.

The proposed method can be applied both to a plant still under construction and to a unit already in operation.

BRIEF DESCRIPTION OF FIGURES

In order to complement the present description and obtain a better understanding of the features of the present invention, and according to a preferred embodiment thereof, in the annex, a set of figures is presented, where in an exemplified, although not limiting, manner, there is represented the preferred embodiment thereof.

DETAILED DESCRIPTION OF THE INVENTION

The method for controlling a plant of separation and treatment industrial processes without chemical reaction, according to a preferred embodiment of the present invention, is described in detail, based on the attached figures.

Figure 1:
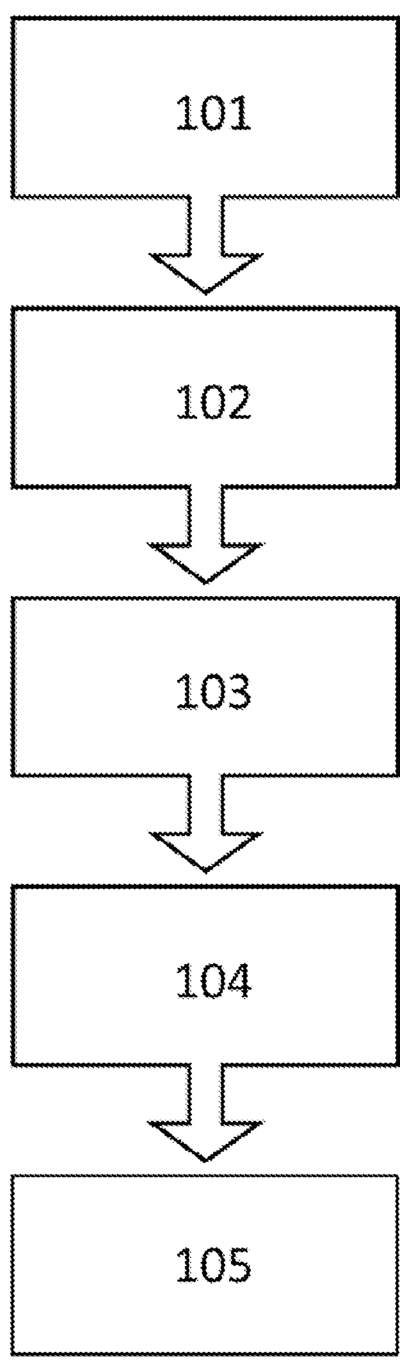
FIG. 1 represents a flowchart of the method for controlling a plant of separation and treatment industrial processes without chemical reaction, according to a preferred embodiment of the present invention.

FIG. 1 presents a flowchart of the method for controlling a plant of separation and treatment industrial processes without chemical reaction, according to a preferred embodiment thereof.

According to FIG. 1, the method for controlling a plant of separation and treatment industrial processes without chemical reaction comprises the step of defining objectives and gains of the plant 101, which comprises defining an objective function of the plant. In this sense, from the definition of the plant, the processes, equipment and their dimensions and the products and inputs needed and used in the same are described to enable the definition of the objective function. The objective function is defined based on the characteristics of processes, equipment, products and inputs of the plant.

More specifically, the step of defining the objectives and gains of the plant 101 comprises defining the objective function of the plant, wherein the objective function is a profit maximization function by increasing productivity or by increasing efficiency. More particularly, the objective function prioritizes the maximization of profit or production, where profit is defined, generally, by the production multiplied by the profit margin; or by the production multiplied by the sales volume minus the costs.

The method for controlling a plant of separation and treatment industrial processes without chemical reaction further comprises the step of delimiting the plant 102.

Specifically, the step of delimiting the plant 102 includes defining the boundary conditions of the problem, identifying process models necessary for the dynamic and static evaluation of the process, according to the objectives defined in the previous step of defining the objectives and gains of the plant 101, and identifying processes that need to use neural networks or deep learning networks to create an accurate model of the behavior of each process.

The boundary conditions of the problem comprise one or more of: degrees of freedom, restrictions, limits and expected conditions of the plant. Specifically, the boundary conditions of the problem are obtained from the plant equipment manufacturers' handbooks and from the technical information of similar plants in operation. More specifically, the degrees of freedom are determined as a function of models and variables obtained from the plant process.

Regarding the identification of processes that need to use neural networks or deep learning networks to create accurate models of the behavior of the processes, in the case of imprecise or non-existent models, deep learning or neural networks must be used to elaborate an accurate model of the process.

The method for controlling a plant of separation and treatment industrial processes without chemical reaction additionally comprises the step of evaluation in steady state of the plant 103, which comprises defining variables to be controlled, and evaluating the productivity and sensitivity of the chosen variables of the process to be controlled against the production performed for each condition foreseen for the process.

Particularly, the variables to be controlled aim at promoting the increase in production in a safe way and maintaining the stability of production, according to the boundary conditions of the problem.

Specifically, the variables are defined according to the importance of the variables to be controlled for the productivity of the plant and promoting strategies that aim at keeping the objective in the best possible condition. The definitions of which variables should be controlled should take into account the control objectives, the information on which variables make the control of the objective variables possible and the sensitivity study for the diverse possible situations of equipment arrangement. Furthermore, the evaluation in steady state of plant 103 further includes evaluating the sensitivity of important variables for the correct implementation of the control loops.

An advantage of the method of the present invention is the fact that the control modes should not be limited to simple situations, since the objective is to maintain the highest possible productivity, even if, for that, the entire system is multivariate or operated using advanced control techniques. In this sense, the cost increase for the implementation of multivariate or advanced controls is small compared to the possible profit with the maximization of production.

The method for controlling a plant of separation and treatment industrial processes without chemical reaction additionally comprises the step of evaluation in dynamic state of the plant 104, which comprises:

- evaluating the stability of the control loops according to the chosen configurations and types, preferably according to the Routh-Hurwitz and Ultimate-Gain criteria;
- evaluating the performance of the control loops based on analysis criteria of error integrals and deviation in relation to plant restrictions;
- generating and evaluating the use of candidate setpoints for maximum production/yield points using genetic algorithms, which includes exploring the universe of optimization created by the genetic algorithms when applied, in order to verify the possibility of using optimal setpoint control and whether it is necessary to review the design of the control loops for their implementation;
- modifying necessary controls to operate in the ranges defined by the genetic algorithms, which maximize the objective function and guarantee stability and performance; and
- reviewing the design of the control loops and implement the control loops.

The method for controlling a plant of separation and treatment industrial processes without chemical reaction also comprises the validation step 105, which includes performing non-linear dynamic simulation of the plant 105, which includes evaluating the candidate setpoints for the maximum of the objective function and the non-reaching of the limits of the process. More specifically, the validation step 105 includes testing the use of the optimal setpoints and the non-reaching of the limits, during the expected behavior that occurs with the plant as a function of time, with the proper actuation of the override control, if necessary.

Figure 2:
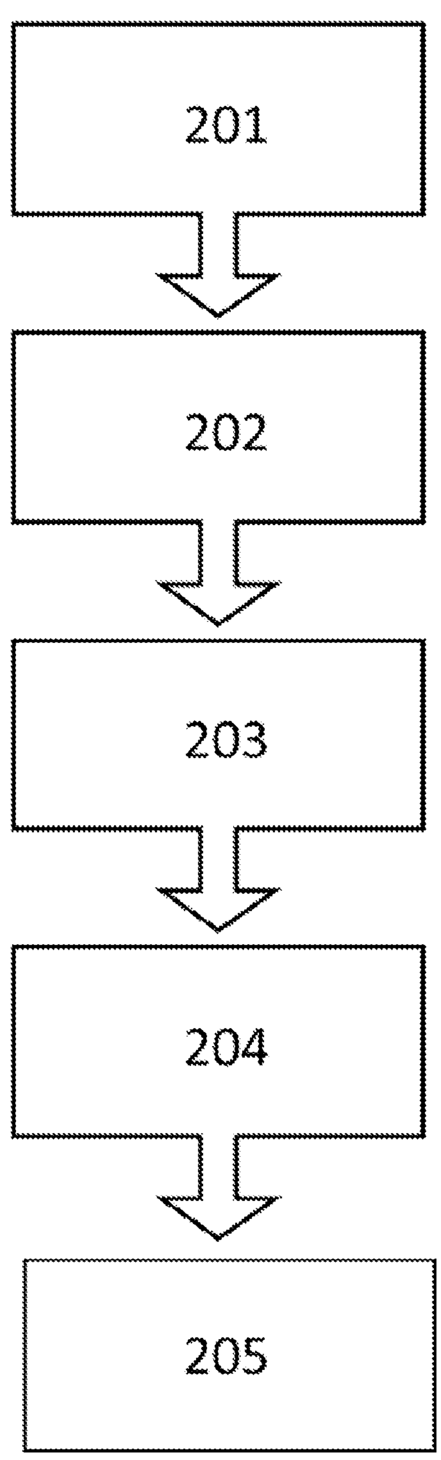
FIG. 2 illustrates a flowchart for applying the genetic algorithm, according to a preferred embodiment of the present invention.

Regarding the application of the genetic algorithm, according to the method of the present invention, FIG. 2 illustrates a flowchart for applying the genetic algorithm, according to a preferred embodiment of the present invention.

According to FIG. 2, the use of the genetic algorithm comprises the steps of: generating a population of chromosomes 201; evaluating the result of the objective function for each defined condition of the chromosomes 202; selecting the chromosomes with the best result to be parents for a new generation 203; creating the new population with the addition of recombinations/mutations and calculating the result of the objective function for the new 204 chromosomes; and repeating the previous steps until the desired values of the objective function 205 are found.

Exemplifying the application of the genetic algorithm, according to an embodiment of the present invention, the step of generating a population of chromosomes 201 includes generating pressure groups/clusters, varying according to the search criteria and dividing the sample space into parts; the step of evaluating the result of the objective function for each condition defined within the chromosomes 202 includes calculating the financial result for each condition defined within the chromosomes; the step of selecting the best-performing chromosomes to be parents for a new generation 203 includes selecting the best-performing pressure groups, subdividing the same, and specifying the new chromosomes; the step of creating the new population with the addition of recombinations/mutations and calculating the result of the objective function for the new chromosomes 204 includes calculating the new maxima of the objective function for each pressure group and comparing with the maxima of the other functions, adding the same to the group, if greater.

According to an exemplary embodiment of the present invention, the method for controlling a plant of separation and treatment industrial processes without chemical reaction is applied in the oil processing system of an FPSO-type (Floating, Production, Storage and Offloading) platform, more specifically, for the design of oil treatment process plant controllers.

In this sense, in the step of defining objectives and gains of plant 101, the maximization objective function is defined as the revenue obtained from the sale of oil and gas products, which is dependent on the liquid-vapor balance and defined by the imposed setpoint conditions, obtaining the result of the process. The cost conditions of the plant are not changed, in general, with the variations in the operational conditions, as the costs remain fixed even if the setpoints are changed. In addition, the cost of acquiring meters and controllers is negligible compared to the revenues obtained from the process. In this case, the objective function applied to the platform under discussion is observed in equation 1, below:

$$J=RG\Sigma G+RL\Sigma L \quad \text{equation 1}$$

wherein:

J is the result of the objective function in R$ per unit of time;

RG is the gas sales revenue in R$/$m^3$;

RL is the oil sales revenue in R$/$m^3$;

G is the gas flow rate produced in $m^3$ per unit of time; and

L is the oil flow rate produced in $m^3$ per unit of time.

The objective function above does not consider production in subsea arrays, as subsea wells are satellites. Particularly, such an objective function is presented as a function of the financial value.

Particularly, for each set of setpoints proposed by the genetic algorithms, there is a different value of this objective function. The above objective function is equally used in the genetic algorithm and for the optimization of the proposed method. The difference resides in the fact that not all solutions proposed by the genetic algorithm are possible to be implemented in practice, due to plant restrictions or the control condition of the equipment to maintain stability. Thus, it is necessary to analyze and identify what is the optimal condition for each case and the possibility of practical implementation, including the analysis of implementing an adaptive control system, if necessary, to enable the setpoint change.

Regarding the step of delimiting the plant 102, in the present example of application, process models were used based on the work of NUNES, Giovani Cavalcanti; DE MEDEIROS, José Luiz; ARAÚJO, Ofélia de Queiroz Fernandes. *Modelagem e controle da produção de petróleo: aplicações em Matlab*. Editora Blucher, 2010. The wells have complex and variable dynamics and therefore do not have predefined models. Therefore, the wells are targets for the use of neural networks to define their behavior.

Regarding the boundary conditions of the problem, such as the restrictions, limits and expected conditions of the plant, these are obtained from the manufacturers' handbooks and from the technical information of similar plants in operation. The degrees of freedom are determined according to the obtained models and variables.

In the step of evaluation in steady state of the plant 103, the variables to be controlled are defined according to their importance in relation to the productivity of the plant and promoting strategies that aim at keeping the objective in the best possible condition and not only by the vision of the state of the art of control stability, as it is possible to obtain more than one stable situation for equipment control. In the example under analysis, the relations for level, pressure and temperature are based on state-of-the-art literature, which has its due technical basis for the equipment under analysis on the platform.

In this context, the design of the FPSO controllers under analysis includes the control of the feeding flow rate, the control of the process setpoints and the override control, in order to guarantee greater productivity to the process. It is still necessary to carry out the evaluation in steady state and evaluate the sensitivity of the important variables for the correct implementation of the control loops.

In the context under analysis, with the definition of the variables, arrangements and controlled variables to be used, the simulation focuses on the representation of the models and control with sufficient validation to analyze the stability and performance of the loops.

In addition, it is necessary to find a solution space for the production inlet flow rates, which maximizes the objective function, generating a setpoint choice function that guarantees the same. It is possible to find several optimal solutions, but it is necessary to evaluate the one that best suits for practical application via simulation experimentation.

Particularly, when analyzing the optimization based on the analysis of the various possible flow rates for the production of the wells, then there is a curve of the best operating condition generated to operationalize the setpoint change. The problem is complex and depends on precision, because if for each vessel it is possible to vary 2 bar (0.2 MPa) of pressure at an analysis precision of 0.1 bar (10 kPa) around its steady state value (20 points for analysis); 10° C. temperature at an analysis accuracy of 0.1° C. around its steady state value (100 points for analysis); the liquid level can vary up to 1 meter at an analysis accuracy of 0.1 m around its steady state value (10 points for analysis); for an inlet flow rate that can vary by a flow rate of 100 kmol/h around the steady state value at an analysis accuracy of 1 kmol/h (100 points for analysis) producing an analysis universe for calculating the efficiency function/objective, for a vessel of $N_p=20\times100\times10\times100=2*10^6$ simulations/responses.

In the condition of increasing the study universe for the optimization of the 5 vessels at the same time, $N_p=20^5\times100^5\times10^5\times100^5=3.2*10^{31}$ simulations needed to be performed in order to find the set of results for the objective function, which will have as optimal point the value that maximizes the same. It is worth noting that if the precision informed above is changed by varying the values of each variable, it is possible to further increase the total number of simulations to be performed, as well as when increasing the universe of analysis of each variable.

The search for the best solution, using the genetic algorithm, reduces the computational effort depending on the size of the chosen population and the criterion used to finalize the method. With this, an unsolvable problem ($3.2*10^{31}$ simulations required) can be turned into a problem with approximate solutions, which can be used in practice to gain in the process.

Convergence occurs by maximizing the objective function, wherein the number of iterations is interpreted by the number of generations in the genetic algorithm.

The previously designed control loops must have their stability and performance evaluated for the optimal situation predicted in the genetic algorithm. For this purpose, the closing of the control loops is carried out from open loop tests to verify the behavior of the process, acquiring information such as the process constant ($K_p$), the dead time ($\theta$) and the time constant ($\tau$), based on the response curve analysis by Ziegler Nichols, Smith's Method by and Sundaresan and Krishnaswamy. Below, equation 2 brings the function to a first order process (First Order Transfer Function—FOTF):

$$G_p(s) = \frac{K_p}{\tau s + 1} e^{-\theta s} \quad \text{equation 2}$$

Then, the loop is closed with the tuning defined by the appropriate method for each case, highlighting tunings such as SD, SINC, Cohen-Coon and Ziegler and Nichols, evaluating the result of the performance indicators for the loop process closed with disturbances in the feeding stream (regulatory mode) and variations in the setpoint (servo mode), choosing the tuning that brings the best result for the set of integral indicators of errors and their variations with stability in the Z domain.

Next, a non-linear dynamic simulation is carried out to validate the design, already testing the use of the optimal setpoints and the non-reaching of the limits, during the expected behavior that occurs with the plant as a function of time, with the proper actuation of the override control if necessary.

Among the various possible strategies to elaborate the design, there is used the strategy of multivariate control of the override type between the operating flow rate and the inlet flow rate of the plant, analyzing its sensitivity in relation to the recycle flow rates between equipment and the possible variations when using neuro-fuzzy logic as a way to sweep the set of control possibilities for the plant.

In the first step of defining objectives and gains for plant 101, the objective function is characterized by the sum of gas and oil flow rates, in STD $m^3$/min, multiplied by the respective revenues, in R$/min, which are given according to the market price. In terms of units, the work was developed in order to compute the flow rates in STD $m^3$/min and the revenue in R$/min.

Next, on the step of delimiting the plant 102, the boundary conditions are defined, identifying the models of the process and carrying out a study in neural networks for situations where there are no models. Table 1 below shows the boundary conditions, limits, restrictions and expected conditions, according to the design of the example plant.

TABLE 1

Boundary conditions, limits, restrictions and expected conditions

| Equipment | Variable | Minimum | Maximum | Setpoint | Unit |
|---|---|---|---|---|---|
| SG-1223001 | Operating pressure | 18 | 22.16 | 19.3 | bar (×0.1 MPa) |
| SG-1223001 | Operating level | 1.3 | 2.8 | 2.1 | meters |
| V-TO-1223001 | Operating pressure | 6.6 | 8.04 | 7 | bar (×0.1 MPa) |
| V-TO-1223001 | Operating interface | 1.25 | 1.97 | 1.6 | meters |
| TO-1223001 | Operating interface | 0.3 | 1.5 | 0.85 | meters |
| V-TO-1223002 | Operating pressure | 1.02 | 2.66 | 2.4 | bar (×0.1 MPa) |
| V-TO-1223002 | Operating interface | 1.25 | 1.97 | 1.6 | meters |
| TO-1223002 | Operating interface | 0.3 | 1.5 | 0.85 | meters |
| P-1223002A/B | Operating temperature | 86 | 101 | 91 | ° C. |
| P-1223005A/B | Operating temperature | 45 | 65 | 55 | ° C. |
| Fiscal meter | Gas flow rate | — | — | 300,000 | STD $m^3$/h |
| Fiscal meter | Liquid flow rate | — | — | 1000 | $m^3$/h |

In the step of evaluation in steady state of plant 103, this begins with the definition of the variables to be manipulated in order to meet the conditions set out in table 1, thus generating table 2 below, which identifies the variables to be manipulated, types of control implemented, the indication of the loops that were closed and their type.

TABLE 2

Variables to be manipulated and types of implemented control

| Equipment | Variable | Manipulated variable | Closed loop type |
|---|---|---|---|
| SG-1223001 | Operating pressure | SG outlet gas flow rate | SISO - Feedback |
| SG-1223001 | Operating interface | SG outlet oil flow rate | SISO - Feedback |
| V-TO-1223001 | Operating pressure | V-TO outlet gas flow rate | SISO - Feedback |
| V-TO-1223001 | Operating interface | V-TO outlet oil flow rate | SISO - Feedback |
| TO-1223001 | Operating interface | TO outlet water flow rate | SISO - Feedback |
| V-TO-1223002 | Operating pressure | V-TO outlet gas flow rate | SISO - Feedback |
| V-TO-1223002 | Operating interface | V-TO outlet oil flow rate | SISO - Feedback |
| TO-1223002 | Operating interface | TO outlet water flow rate | SISO - Feedback |
| P-1223002A/B | Operating Temperature | Heating water flow rate | SISO - Feedback |
| P-1223005A/B | Operating Temperature | Cooling water flow rate | SISO - Feedback |
| Fiscal meter | Gas flow rate | Well choke opening | MIMO - Fuzzy-PID |
| Fiscal meter | Liquid flow rate | Well choke opening | MIMO - Fuzzy-PID |
| All | Limitation of the variables above | Well choke opening | MIMO - Override |

Moving on to the step of evaluation in dynamic state of the plant 104, this is carried out during the application of the proposed method for the design of the controllers, where there is stability and performance of the loops.

In turn, in the validation step 105, a non-linear dynamic simulation is performed to validate the design with the evaluation of the candidate setpoints for the maximum objective function and the non-reaching of the process limits.

According to the proposed method, good financial results are obtained. In addition, the performance indicators related to the integrals of the errors are up to 90% lower.

The implementation of the neuro-fuzzy flow rate control logic allows the plant to work at the nominal flow rate in closed loop, generating a gain related to the difference between the carried-out production and the nominal production, for certain periods of time. The difference between the carried-out production and the nominal production is related to what is produced during the time the plant does not operate in its nominal condition and waits for the operator's reaction time to increase the flow rate of the wells, which today operate without automation and which need the operator's manual actuation, and the production is carried out with neuro-fuzzy logic, in closed loop, which returns the plant to nominal flow rate in a few minutes.

The difference in production depends on the plant operator and the moment in which the reduction in efficiency occurs, and an average monthly gain of 25.6 $m^3$ of oil was calculated between the time of actuation of the neuro-fuzzy control and the operator reaction time.

In addition, there can be noted the financial gain related to the optimization of production, when defining the optimal pressure setpoints, against the objective function with the genetic algorithm, since, when working on the optimal points in relation to the setpoints operated in the plant, there is a difference of 140.5 R$/h during the operation.

In this sense, it was possible to activate the override control over the flow rate, avoiding plant shutdowns by acting preventively when reaching some process limit, without this being exceeded. As it is difficult to measure which plant shutdowns would or would not be avoided, since these data are not available, it was considered that 1 (one) shutdown is avoided per year, representing about 12 million reais, which is equivalent to avoiding an oil plant shutdown about 4 hours long per year.

Another advantage brought by the proposed method is the possibility of reducing the number of operators to control the process, since, with the addition of setpoint automation, feeding flow rate and override, it is possible to reduce, for example, 16 control and monitoring operators of the process to 14 or 12 operators. In this sense, taking into account that for each offshore job, there are 2.5 people scheduled for work, so there is a reduction in personnel that can be around 5 to 10 operators in total. Taking into account that each operator, together with the logistics of helicopters and supplies to board him/her and keep him/her working, and his/her salary with all charges can reach 300 thousand reais per year, then there is an optimization of up to 3 million reais per year per platform.

Simulation and Validation of Oil Processing Plant Models

More particularly, according to a preferred exemplary embodiment of the method of the present invention, applied to the oil processing system of an FPSO-type platform, the process models were simulated in the form of circuits and sequenced in blocks.

As boundary conditions to carry out the simulation, current actual information present in the oil processing of the FPSO under analysis was used for the measured variables and some information that is not subject to continuous measurement because it is fixed, such as the dimensions of the equipment, that were taken from the premises of the platform design.

As this information is in relation to the technology used by the FPSO, it is presented in table 3, below, in the form of relative or percentage results, thus guaranteeing the analysis condition. It is worth mentioning that the presented results are related to the percentage error of the predicted value in the simulator and the actual value found in the platform or design.

TABLE 3

Simulations performed to validate the models

| COMPARATIVE | UNITS | WHAT WAS VALIDATED |
|---|---|---|
| Design × Simulation 1 | $m^3$/min and ° C. | Flow rate, level and temperature equations |
| Actual at full load × Simulation 2 | $m^3$/min and ° C. | Pressure, flow rate, level and temperature equations |
| Actual at 85% load × Simulation 3 | $m^3$/min and ° C. | Pressure, flow rate, level and temperature equations |

According to table 3, in the first comparison, that is, in the simulation 1 with the design data, there can be observed a good correlation, low error (table 4) between the values found with the flow rate models of oil and gas, temperature in the system as a whole and the level in the separator vessels.

TABLE 4

Comparison between the result of Simulation 1 versus the FPSO design
COMPARISON OF SIMULATION X DESIGN

| Equipment | Pressure Inlet (kPa) | Pressure Outlet (kPa) | Temp. Inlet (° C.) | Temp. Output (° C.) | Q Liq. Inlet ($m^3$/h) | Q Liq. Outlet ($m^3$/h) | Q Gas Outlet ($m^3$/h) | Level (m) |
|---|---|---|---|---|---|---|---|---|
| SG-1223001 | 0% | 1 | 0% | | −4% | −4% | 1% | 4% |
| P-1223001 Tub | — | — | 0% | 5% | −4% | −3% | — | — |
| P-1223001 Cas | — | — | −1% | 1% | −2% | −3% | — | — |
| P-1223002 | — | — | 5% | −1% | −3% | −2% | — | — |
| V-TO-1223001 | −20% | −20% | −2% | | −5% | — | −5% | 16% |
| TO-1223001 | −20% | −20% | 1% | | | — | — | −4% |
| V-TO-1223002 | 13% | 13% | 1% | | −2% | — | 1% | 9% |
| TO-1223002 | 13% | 27% | −1% | | | 2% | — | −18% |
| P-1223005 | — | — | 1% | −9% | −3% | −3% | — | — |

Furthermore, it was not possible to observe a good correlation of the equation that calculates the pressure, as there were divergences between the values found in simulation 1 and the design values, which is justified by the fact that the current situation allows the separator vessels to work with lower pressures than the pressure foreseen in the design, obtaining a better result in the separation of the gas, where it is possible to validate this vision by simulation 2 and 3 carried out by comparison with the actual data of the plant.

Thus, there are larger errors shown in the column representing the inlet and outlet pressure of the degassing vessels V-TO-1223001 and V-TO-1223002, where the current condition is an optimization applied by the Platform operator. As can be seen in the study of the objective function of the genetic algorithm, which is presented in the following sections, the current condition is much closer to the financial optimal condition than the design condition.

Now, with simulation 2 (table 5) and simulation 3 (table 6), it is possible to validate the equations for calculating pressure, flow rate, level and temperature for two different conditions of flow rate of the plant.

In table 5, simulation 2 used the input data, which are the pressures and flow rates at the inlet of the SG-1223001 and the thermal exchange streams of the exchangers with the operating flow rate equal to 100% of the nominal flow rate of the plant.

TABLE 5

Comparison of simulation 2 versus reality at full load
COMPARISON OF SIMULATION 2 X REALITY AT FULL LOAD

| Equipment | Pressure Inlet (kPa) | Pressure Outlet (kPa) | Temp. Inlet (° C.) | Temp. Output (° C.) | Q Liq. Inlet ($m^3$/h) | Q Liq. Outlet ($m^3$/h) | Q Gas Outlet ($m^3$/h) | Level (m) |
|---|---|---|---|---|---|---|---|---|
| SG-1223001 | −1% | −1% | −2% | | — | 1% | −1% | −7% |
| P-1223001 Tub | — | — | 2% | 1% | — | — | — | — |
| P-1223001 Cas | — | — | 2% | 3% | — | — | — | — |
| P-1223002 | — | — | 1% | 1% | — | — | — | — |
| V-TO-1223001 | −3% | −3% | 4% | | — | — | −4% | −8% |
| TO-1223001 | −7% | −7% | 2% | | — | — | 1 | 6% |
| V-TO-1223002 | −6% | −5% | 5% | | — | — | −2% | −4% |
| TO-1223002 | −5% | 7% | 4% | | — | 2% | — | 7% |
| P-1223005 | — | — | 3% | −4% | — | — | — | — |

Simulation 3 in Table 6 was compared with the plant operating flow rate at 85% of the nominal flow rate in a period in which the platform was in this condition. This flow rate range was chosen for validation, as it is the universe of analysis of the expected disturbances to analyze the effectiveness of the controls. Normally, there are no disturbances with variations greater than 15% in the day-to-day operation of the equipment and therefore the control must be effective for this universe. Furthermore, it is not expected to operate much below the nominal flow rate during the lifetime of the installation.

TABLE 6

Comparison of simulation 3 versus reality at 85% load
COMPARISON OF SIMULATION 3 X REALITY AT 85% LOAD

| Equipment | Pressure Inlet (kPa) | Pressure Outlet (kPa) | Temp. Inlet (° C.) | Temp. Output (° C.) | Q Liq. Inlet ($m^3$/h) | Q Liq. Outlet ($m^3$/h) | Q Gas Outlet ($m^3$/h) | Level (m) |
|---|---|---|---|---|---|---|---|---|
| SG-1223001 | −3% | −3% | | −2% | — | 3% | −2% | 2% |
| P-1223001 Tub | — | — | 1% | 2% | — | — | — | — |
| P-1223001 Cas | — | — | 2% | 2% | — | — | — | — |
| P-1223002 | — | — | 3% | 4% | — | — | — | — |
| V-TO-1223001 | −6% | −6% | | 4% | — | — | −7% | 5% |
| TO-1223001 | −8% | −8% | | 5% | — | — | — | 4% |
| V-TO-1223002 | −9% | −7% | | 5% | — | — | −9% | 6% |
| TO-1223002 | −7% | 7% | | 2% | — | 4% | — | 3% |
| P-1223005 | — | — | 2% | −3% | — | — | — | — |

It is important to note that the errors are relatively low, in general, and the level/interface model presents a smaller variation with the actual data, since, in practice, the level of treatment items TO-1223001 and TO-1223002 is under the effect of an ON-OFF control that takes them to the lower end of the base of the vessels, as the wells are not producing water and therefore the thickness of water in the vessels exists only to keep the cycle operational. The other variables are showing good results, the error being a little higher in the pressure at the end of the process than at the beginning, since the absolute value of the pressure at the end of the process is much smaller than at the beginning; so, any small variation in the total becomes more representative in percentage.

Design and Implementation of Conventional Controllers in Simulated Equipment According to the Scheme Currently Used by the Platform The various equipment that are interconnected to promote the treatment of the platform under analysis have conventional feedback controls in their structures to guarantee the stability of the treatment in the equipment. With this, the use of this already-implemented logic is carried out, since it has no additional cost and presents desired configurations.

To implement the temperature control in P-1223002 (heater) and P-1223005 (cooler), it was necessary to carry out an open loop test with a step-type disturbance equal to the increment of 0.48 mA at the output of the controller a in order to evaluate its deformation to the step in the temperature gauge and thus be able to analyze the behavior of the process using the curves of Ziegler Nichols (ZN), Smith's Method (MS) and Sundaresan and Krishnaswamy (SK) when defining $K_p$, $\theta$ and $\tau$ for each case.

Next, the calculation of the possible tunings to control these variables was performed and those that had a value consistent with the control assumptions of the method were chosen for tests; for example, for the Ziegler Nichols tuning method, the uncontrollability factor is evaluated. At the end, the tuning was applied in the simulation, and the performance indicators were evaluated for a disturbance of 4% in the feeding flow rate and 2.2% in the setpoint in a 60-minute simulation.

For each combination of the response curve analysis method with the most appropriate tuning, a test was carried out, where in tables 7 and 8, below, the found results are shown and which tunings were chosen, which are highlighted in grey.

TABLE 7

Table of possible tunings for temperature and performance indicators for P-1223002

| OPEN LOOP RESPONSE ADJUSTMENT | TUNED BY | Mode | IAE | ISE | ITAE | ITSE | CE |
|---|---|---|---|---|---|---|---|
| Ziegler and Nichols | Ziegler and Nichols | Servo | 2.74 | 0.82 | 12.38 | 1.92 | 0.018 |
| Ziegler and Nichols | Ziegler and Nichols | Regulatory | 0.72 | 0.053 | 3.68 | 0.15 | 0.011 |
| Ziegler and Nichols | Cohen-Coon | Servo | 2.05 | 0.62 | 6.92 | 1.074 | 0.019 |
| Ziegler and Nichols | Cohen-Coon | Regulatory | 0.54 | 0.0392 | 2.24 | 0.09 | 0.011 |
| Ziegler and Nichols | IMC $\tau c = (\theta + \tau)/2$ | Servo | 1.84 | 0.55 | 5.8 | 0.909 | 0.033 |
| Ziegler and Nichols | IMC $\tau c = (\theta + \tau)/2$ | Regulatory | 0.49 | 0.0341 | 1.87 | 0.07 | 0.015 |
| Smith's method | IMC $\tau c = \tau/10$ | Servo | 1.05 | 0.35 | 1.95 | 0.359 | 0.066 |
| Smith's method | IMC $\tau c = \tau/10$ | Regulatory | 0.28 | 0.0206 | 0.778 | 0.03 | 0.019 |
| Sundaresan and Krishnaswamy | IMC $\tau c = \tau/10$ | Servo | 1.31 | 0.42 | 2.76 | 0.47 | 0.025 |
| Sundaresan and Krishnaswamy | IMC $\tau c = \tau/10$ | Regulatory | 0.35 | 0.0258 | 0.988 | 0.04 | 0.013 |

TABLE 8

Table of possible tunings for temperature and performance indicators for P-1223005

| OPEN LOOP RESPONSE ADJUSTMENT | TUNED BY | Mode | IAE | ISE | ITAE | ITSE | CE |
|---|---|---|---|---|---|---|---|
| Ziegler and Nichols | Ziegler and Nichols | Servo | 7.41 | 6.87 | 30.17 | 15.69 | 0.0175 |
| Ziegler and Nichols | Ziegler and Nichols | Regulatory | 0.66 | 0.03 | 4.54 | 0.159 | 0.0292 |
| Ziegler and Nichols | IMC τc = θ | Servo | 11.5 | 7.69 | 91.56 | 36.93 | 0.0019 |
| Ziegler and Nichols | IMC τc = θ | Regulatory | 3.89 | 0.72 | 37.05 | 4.46 | 0.0063 |
| Smith's method | IMC τc = τ/10 | Servo | 8.8 | 7.97 | 36.69 | 22.99 | 0.0037 |
| Smith's method | IMC τc = τ/10 | Regulatory | 0.86 | 0.05 | 6.65 | 0.27 | 0.0088 |
| Sundaresan and Krishnaswamy | IMC τc = τ/10 | Servo | 12.12 | 7.29 | 111 | 42.78 | 0.002 |
| Sundaresan and Krishnaswamy | IMC τc = τ/10 | Regulatory | 6.157 | 1.662 | 63.3 | 11.61 | 0.0056 |

As the response to disturbance to the temperature control has dead time, given the characteristic of the sensor and the capacitance of the exchanger, then a more average acquisition time is used; in this case, 6 seconds were used, to ensure that no if you have aliasing in the acquisition of the curve.

For each optimal condition found above, a test was performed to verify the effectiveness of the control for a disturbance in the feeding flow rate and for the change of setpoint. The controls present small variations in regulatory mode and fast response in servo mode to a 4% feeding stream disturbance and setpoint change.

It is worth noting that the stability of each case was also studied, where the Z transform of the function was performed, applied to the control loop function in the Z domain with the acquisition rate defined for the data hold of order 0, found the root locus and then using the Routh-Hurwitz criterion, with guaranteed stability for the two loops.

To implement the pressure control on the SG-1223001, V-TO-1223001 and V-TO-1223002, it was necessary to carry out an open-loop test with a step-type disturbance equal to the increment of 0.48 mA at the output of the controller in order to evaluate in the pressure gauge its deformation to the step and with that to be able to analyze the behavior of the process by the curves of Ziegler Nichols (ZN), Smith's Method (MS) and Sundaresan and Krishnaswamy (SK) when defining $K_p$, θ and τ for each case.

Subsequently, the calculation of the possible tunings to control these variables and chosen for testing those that had a value coherent with the control assumptions of the method. At the end, the tuning was applied in the simulation and the performance indicators were evaluated for a disturbance of 4% in the feeding flow rate and 2.6% in the setpoint in a 50-minute simulation. For each combination of the response curve analysis method with the most appropriate tuning, a test was carried out, where in tables 9, 10 and 11, below, there are shown the found results and which tuning was chosen, which are highlighted in gray.

TABLE 9

Table of possible pressure tunings and performance indicators for SG-1223001

| OPEN LOOP RESPONSE ADJUSTMENT | TUNED BY | Mode | IAE | ISE | ITAE | ITSE | CE |
|---|---|---|---|---|---|---|---|
| Ziegler and Nichols | SIMC τi = τ | Servo | 0.198 | 0.066 | 0.089 | 0.0088 | 0.0077 |
| Ziegler and Nichols | SIMC τi = τ | Regulatory | 0.078 | 0.006 | 0.054 | 0.0022 | 0.008 |
| Ziegler and Nichols | SIMC τi = 4(θ + τc) | Servo | 0.218 | 0.075 | 0.128 | 0.0099 | 0.0077 |
| Ziegler and Nichols | SIMC τi = 4(θ + τc) | Regulatory | 0.125 | 0.011 | 0.108 | 0.0058 | 0.0078 |
| Smith's method | SIMC τi = τ | Servo | 0.194 | 0.065 | 0.081 | 0.0092 | 0.0088 |
| Smith's method | SIMC τi = τ | Regulatory | 0.064 | 0.005 | 0.039 | 0.0015 | 0.0082 |
| Smith's method | SIMC τi = 4(θ + τc) | Servo | 0.208 | 0.071 | 0.112 | 0.0092 | 0.0077 |
| Smith's method | SIMC τi = 4(θ + τc) | Regulatory | 0.101 | 0.0085 | 0.079 | 0.0038 | 0.0078 |
| Sundaresan and Krishnaswamy | SIMC τi = τ | Servo | 0.496 | 0.1854 | 0.4418 | 0.0577 | 0.0073 |
| Sundaresan and Krishnaswamy | SIMC τi = τ | Regulatory | 0.3173 | 0.0482 | 0.3831 | 0.0387 | 0.0077 |
| Sundaresan and Krishnaswamy | SIMC τi = 4(θ + τc) | Servo | 1.526 | 0.2903 | 6.821 | 0.5123 | 0.0072 |
| Sundaresan and Krishnaswamy | SIMC τi = 4(θ + τc) | Regulatory | 2.326 | 0.5029 | 12.13 | 1.474 | 0.077 |

TABLE 10

Table of possible pressure tunings and performance indicators for V-TO-1223001

| OPEN LOOP RESPONSE ADJUSTMENT | TUNED BY | Mode | IAE | ISE | ITAE | ITSE | CE |
|---|---|---|---|---|---|---|---|
| Ziegler and Nichols | SIMC τi = τ | Servo | 0.555 | 0.101 | 0.944 | 0.069 | 0.042 |
| Ziegler and Nichols | SIMC τi = τ | Regulatory | 0.693 | 0.1017 | 1.66 | 0.161 | 0.49 |
| Smith's method | SIMC τi = τ | Servo | 0.2912 | 0.07 | 0.179 | 0.023 | 0.043 |
| Smith's method | SIMC τi = τ | Regulatory | 0.3479 | 0.051 | 0.420 | 0.0516 | 0.049 |
| Sundaresan and Krishnaswamy | SIMC τi = τ | Servo | 0.289 | 0.069 | 0.178 | 0.023 | 0.043 |
| Sundaresan and Krishnaswamy | SIMC τi = τ | Regulatory | 0.3422 | 0.05 | 0.409 | 0.05 | 0.049 |

TABLE 11

Table of possible pressure tunings and performance indicators for V-TO-1223002

| OPEN LOOP RESPONSE ADJUSTMENT | TUNED BY | Mode | IAE | ISE | ITAE | ITSE | CE |
|---|---|---|---|---|---|---|---|
| Ziegler and Nichols | SIMC τi = τ | Servo | 0.149 | 0.031 | 0.1051 | 0.00475 | 0.086 |
| Ziegler and Nichols | SIMC τi = τ | Regulatory | 0.166 | 0.0222 | 0.122 | 0.01 | 0.05 |
| Ziegler and Nichols | SIMC τi = 4(θ + τc) | Servo | 0.2177 | 0.041 | 0.167 | 0.011 | 0.083 |
| Ziegler and Nichols | SIMC τi = 4(θ + τc) | Regulatory | 0.311 | 0.044 | 0.348 | 0.0337 | 0.0496 |
| Smith's method | SIMC τi = τ | Servo | 0.1542 | 0.031 | 0.11 | 0.0051 | 0.086 |
| Smith's method | SIMC τi = τ | Regulatory | 0.178 | 0.024 | 0.136 | 0.012 | 0.05 |
| Smith's method | SIMC τi = 4(θ + τc) | Servo | 0.2338 | 0.043 | 0.194 | 0.012 | 0.083 |
| Smith's method | SIMC τi = 4(θ + τc) | Regulatory | 0.3349 | 0.048 | 0.399 | 0.049 | 0.038 |
| Sundaresan and Krishnaswamy | SIMC τi = τ | Servo | 0.2096 | 0.0286 | 0.18 | 0.016 | 0.05 |
| Sundaresan and Krishnaswamy | SIMC τi = τ | Regulatory | 0.166 | 0.0337 | 0.119 | 0.006 | 0.084 |
| Sundaresan and Krishnaswamy | SIMC τi = 4(θ + τc) | Servo | 0.278 | 0.047 | 0.28 | 0.0165 | 0.084 |
| Sundaresan and Krishnaswamy | SIMC τi = 4(θ + τc) | Regulatory | 0.3998 | 0.057 | 0.56 | 0.052 | 0.049 |

As the response to disturbance to the pressure control is fast, a very small acquisition time is required; in this case, it was 1 second, and even so the response has practically no dead time, but it guarantees that there is no aliasing in curve acquisition.

For each above-found optimal condition, a test was performed to verify the effectiveness of the control for a disturbance in the feeding flow rate and for the change of setpoint. The above-shown controls present small variations in regulatory mode and fast response in servo mode to a 4% feeding stream disturbance and a setpoint change.

It is worth mentioning that the stability of each case was also evaluated. As there is practically no dead time for the pressure case, the stability analysis was made using Ultimate Gain, where all designed Kc are within the range of 0.45 KCU.

To implement the interface control on the SG-1223001, V-TO-1223001 and V-TO-1223002, it was necessary to perform an open-loop test with a step-type disturbance equal to the increment of 0.48 mA at the output of the controller in order to evaluate in the level sensor its deformation to the step and with that to be able to analyze the behavior of the process by the curves of Ziegler Nichols (ZN), Smith's Method (MS) and Sundaresan and Krishnaswamy (SK) when defining $K_p$, θ and τ for each case.

From this, the calculation of the possible tunings to control these variables was made and there were chosen for tests those that had a value consistent with the control assumptions of the method; for example, for SIMC, the τi and τc relevant to the technique are evaluated. At the end, the tuning was applied in the simulation and the performance indicators were evaluated for a disturbance of 4% in the feeding flow rate and 5% in the setpoint in a 50-minute simulation. For each combination of the response curve analysis method with the most appropriate tuning, a test was carried out, where tables 12, 13 and 14, below, show the found results and which tuning was chosen, which are indicated by a gray background.

TABLE 12

Table of possible level tunings and performance indicators for SG-1223001

| OPEN LOOP RESPONSE ADJUSTMENT | TUNED BY | Mode | IAE | ISE | ITAE | ITSE | CE |
|---|---|---|---|---|---|---|---|
| Ziegler and Nichols | IMC | Servo | 0.754 | 0.2 | 1.35 | 0.148 | 0.0063 |
| Ziegler and Nichols | IMC | Regulatory | 0.072 | 0.0014 | 0.14 | 0.0022 | 0.0037 |
| Smith's method | IMC | Servo | 0.755 | 0.2 | 1.36 | 0.149 | 0.0063 |
| Smith's method | IMC | Regulatory | 0.071 | 0.0014 | 0.14 | 0.0022 | 0.0037 |
| Sundaresan and Krishnaswamy | IMC | Servo | 0.756 | 0.2 | 1.36 | 0.151 | 0.0063 |
| Sundaresan and Krishnaswamy | IMC | Regulatory | 0.069 | 0.0014 | 0.14 | 0.0021 | 0.0038 |

TABLE 13

Table of possible level tunings and performance indicators for V-TO-1223001

| OPEN LOOP RESPONSE ADJUSTMENT | TUNED BY | Mode | IAE | ISE | ITAE | ITSE | CE |
|---|---|---|---|---|---|---|---|
| Ziegler and Nichols | SIMC $\tau i = \tau$ | Servo | 0.641 | 0.276 | 0.514 | 0.158 | 0.0043 |
| Ziegler and Nichols | SIMC $\tau i = \tau$ | Regulatory | 0.042 | 0.0019 | 0.045 | 0.0015 | 0.0031 |
| Ziegler and Nichols | SIMC $\tau i = 4(\theta + \tau c)$ | Servo | 0.503 | 0.202 | 0.3897 | 0.0667 | 0.0043 |
| Ziegler and Nichols | SIMC $\tau i = 4(\theta + \tau c)$ | Regulatory | 0.054 | 0.0021 | 0.078 | 0.0034 | 0.0019 |
| Smith's method | SIMC $\tau i = \tau$ | Servo | 2.35 | 0.725 | 11.91 | 1.812 | 0.045 |
| Smith's method | SIMC $\tau i = \tau$ | Regulatory | 0.759 | 0.0797 | 4.024 | 0.2205 | 0.088 |
| Smith's method | SIMC $\tau i = 4(\theta + \tau c)$ | Servo | 0.536 | 0.226 | 0.346 | 0.095 | 0.0044 |
| Smith's method | SIMC $\tau i = 4(\theta + \tau c)$ | Regulatory | 0.035 | 0.002 | 0.031 | 0.0014 | 0.0031 |
| Sundaresan and Krishnaswamy | SIMC $\tau i = \tau$ | Servo | 1.334 | 0.455 | 3.296 | 0.579 | 0.0045 |
| Sundaresan and Krishnaswamy | SIMC $\tau i = \tau$ | Regulatory | 0.1052 | 0.0031 | 0.277 | 0.0045 | 0.0033 |
| Sundaresan and Krishnaswamy | SIMC $\tau i = 4(\theta + \tau c)$ | Servo | 0.508 | 0.2038 | 0.377 | 0.073 | 0.0045 |
| Sundaresan and Krishnaswamy | SIMC $\tau i = 4(\theta + \tau c)$ | Regulatory | 0.05 | 0.002 | 0.059 | 0.0017 | 0.003 |

TABLE 14

Table of possible level tunings and performance indicators for V-TO-1223002

| OPEN LOOP RESPONSE ADJUSTMENT | TUNED BY | Mode | IAE | ISE | ITAE | ITSE | CE |
|---|---|---|---|---|---|---|---|
| Ziegler and Nichols | SIMC $\tau i = \tau$ | Servo | 0.7377 | 0.2437 | 1.071 | 0.1498 | 0.0047 |
| Ziegler and Nichols | SIMC $\tau i = \tau$ | Regulatory | 0.1463 | 0.0076 | 0.275 | 0.0114 | 0.0035 |
| Smith's method | SIMC $\tau i = \tau$ | Servo | 0.8199 | 0.2661 | 1.332 | 0.2 | 0.0047 |
| Smith's method | SIMC $\tau i = \tau$ | Regulatory | 0.1379 | 0.0068 | 0.272 | 0.0097 | 0.0036 |
| Sundaresan and Krishnaswamy | SIMC $\tau i = \tau$ | Servo | 0.8162 | 0.2654 | 1.319 | 0.1985 | 0.0047 |
| Sundaresan and Krishnaswamy | SIMC $\tau i = \tau$ | Regulatory | 0.1378 | 0.0068 | 0.27 | 0.0097 | 0.0036 |

As the response to the disturbance for the level control is slow, then a longer acquisition time is necessary; in this case, it was 30 seconds, and, even then, the response has practically no dead time, but it guarantees that there is no aliasing in curve acquisition.

For each optimal condition found, a test was carried out to verify the effectiveness of the control for a disturbance in the feeding flow rate and for the change of setpoint.

The above-shown controls show small variations in regulatory mode and fast response in servo mode to a disturbance in the feeding stream of 4% and a change in the setpoint.

It is worth mentioning that the stability of each case was also evaluated. As there is practically no dead time for the case of the level in this condition of acquisition time of 30 seconds, then the stability analysis was used through Ultimate Gain, where all designed $K_c$ are within the range of 0.45 $K_{CU}$.

Setpoint Change by Expert System with Genetic Algorithms

When elaborating the objective function for the present exemplary case, it is noted that the process is more profitable as the ratio between what is produced from oil and gas approaches its maximum, when multiplying the volumes produced by the revenue from sale. The cost scenario does not change when the production methods are changed, via a change in the setpoint for the installed structure.

Thus, a genetic algorithm was elaborated to evaluate which are the maximum points of the objective function and the respective operating setpoints.

With implemented controllers for operating temperature, separator pressures, and vessel level, it is possible to control well production. When analyzing these factors, it is verified that the level interferes little in the production, since it does not affect the separation rate in a significant way. The temperature, on the other hand, has a great influence, but in the case under analysis it is not changed, because above the temperature carried out in the P-1223002 there is a risk of boil over in the V-TO-1223001, if it is exceeded or the process is out of control; and operating below the temperature is not recommended, as it may reduce the efficiency of the process and may even make it unfeasible to replace P-1223001.

Thus, the feed pressure and flow rate are targeted to optimize the objective function.

From the premise that the ideal flow rate range is the one that is close to the nominal value of the plant, and the gas range is that referring to the separated in each separator vessel in the possible range of pressure control and operational limits, it was chosen to carry out the study by varying the flow rate of the feeding plant as a function of the pressure in each separation stage.

The developed genetic algorithm received the flow rate and pressure information of each stage as a genetic code and discretized, within the limits normally used for process control, into 8 chromosomes for pressure, equally distributed among the process variation limits, and split to 4 flow rate clusters/populations, equally spaced within the studied boundaries with 8 chromosomes within each cluster.

Thus, the calculation of the result of the objective function was carried out so that the setpoint control could be optimized.

Three generations were performed, which were sufficient to find, with good precision, the optimal operating pressures and revenues per inlet flow rate. The first generation results from the input information of the genetic code and the second and third generations are specified from the choice of the pressure that brought the highest result to the objective function for a tournament-type selection algorithm that rewrites the chromosomes into 8 equally parts distributed around the maximum points found with a dispersion step 4 times smaller than that of the previous generation, thus generating a crossing-over reproduction that guarantees convergence to the maximum value for the flow rate under study.

As a financial result, a growth was identified with an increase in the inlet flow rate, as expected, since the greater the input production, the greater the result.

In the case of pressure, for each flow rate level, the pressure that maximizes the objective function was found, based on the search technique provided by the genetic algorithm.

Figure 3:
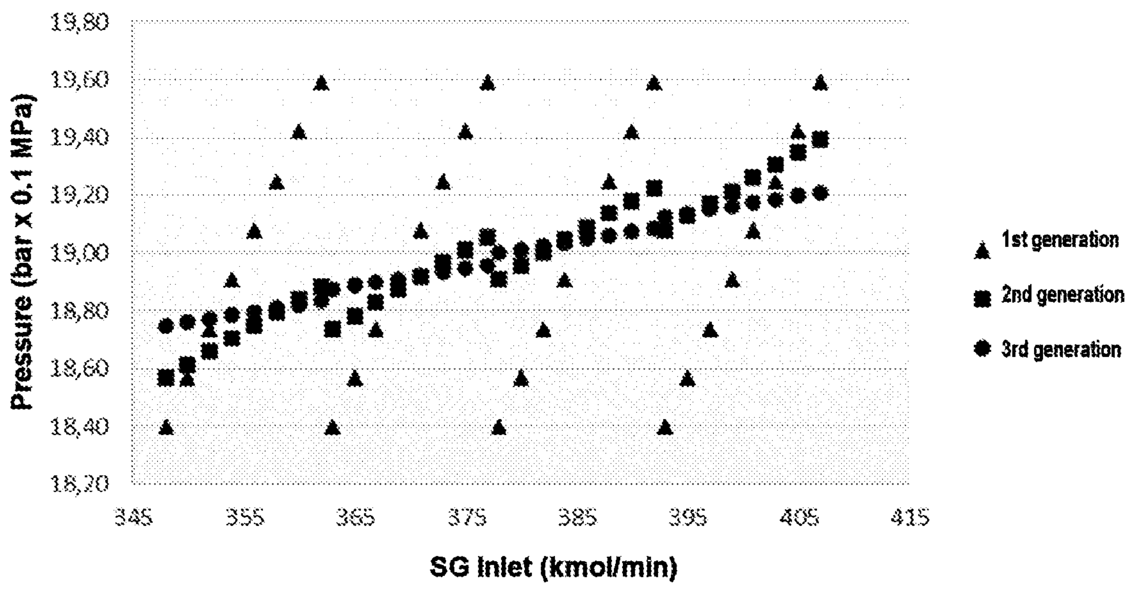
FIG. 3 illustrates a graph representing the pressure ratio per flow rate per generation for an example of application of the method of the present invention, according to a preferred embodiment thereof.

FIG. 3 illustrates a graph representing the pressure ratio per flow rate per generation for an example of application of the method of the present invention, according to a preferred embodiment thereof.

Specifically, the graph in FIG. 3 identifies that the search starts, in the first generation, at predetermined values, which are the operational limits of pressure variation.

In the second generation, the father is chosen as the pressure value of the chromosome of the first generation that follows the maximum pressure value found; and the choice of the mother, which is the pressure prior to the maximum pressure found on the input chromosome, thus generating offspring that guarantee that their genetic material contains the necessary information for data refinement, obtaining greater proximity to the maximum value of the function, but still with a linear view around the central maximum point found, since the chromosomes were generated from the interval division, where the maximum was found in 8 equal parts, therefore linear.

At the end of the third generation, there is the pressure value, where the maximum was found, representing almost a single curve with little inclination, showing that there was found the pressure function that maximizes the objective function, as a function of the pressure and flow rate satisfactorily.

Figure 4:
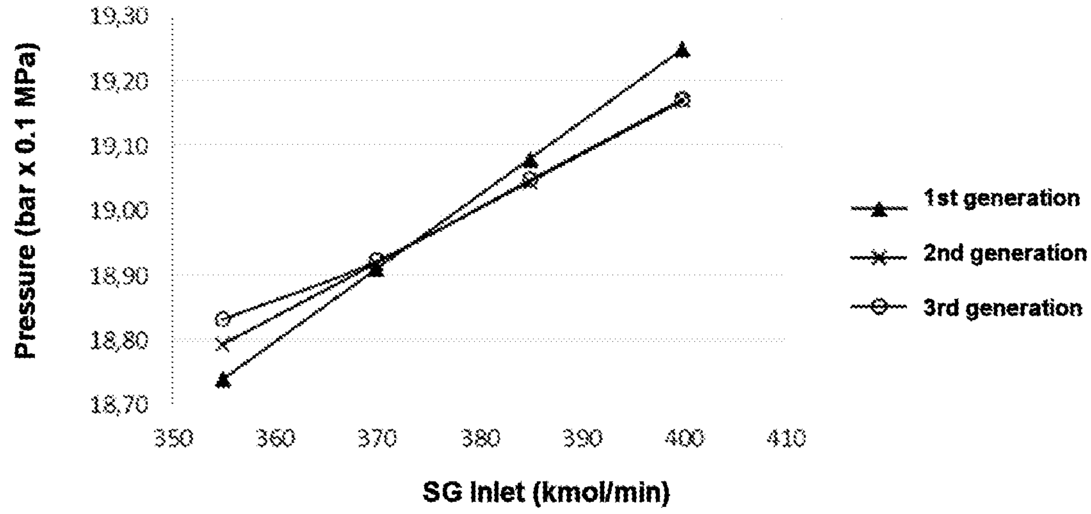
FIG. 4 represents a graph of pressure by flow rate, per generation, for the highest result of the objective function, for an example of application of the method of the present invention, according to a preferred embodiment thereof.

FIG. 4, on the other hand, represents a pressure graph per flow rate, per generation, for the highest result of the objective function, for an example of application of the method of the present invention, according to a preferred embodiment thereof.

In FIG. 4, it is possible to observe in detail the elaboration of the maximum revenue curves as a function of pressure and flow rate and how it becomes non-linear in the last generation. With this function, it is already possible to optimize the automatic setpoint in order to increase revenue, as can be seen in FIG. 5.

Figure 5:
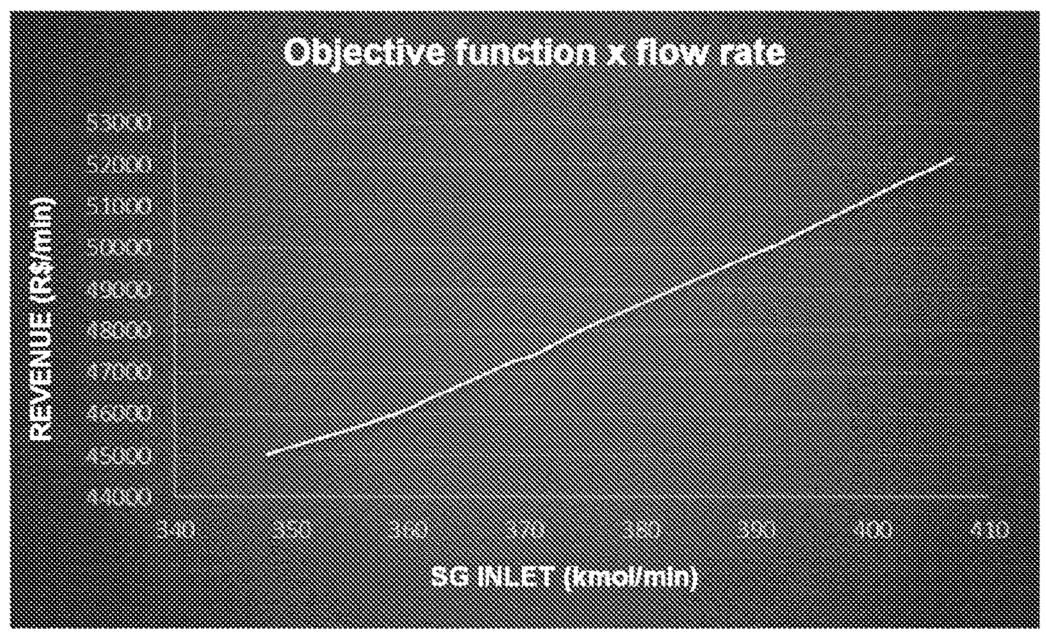
FIG. 5 presents a graph with the result of the objective function by flow rate for the optimal pressures, for an example of application of the method of the present invention, according to a preferred embodiment thereof.

FIG. 5 shows a graph with the result of the objective function by flow rate for the optimal pressures, for an example of application of the method of the present invention, according to a preferred embodiment thereof.

It is worth emphasizing that the current setpoint condition for the other equipment was considered in order to evaluate the backpressure and the produced volume of gas for the calculation of the objective function revenue for the entire platform, all of this under standard conditions.

Figure 6:
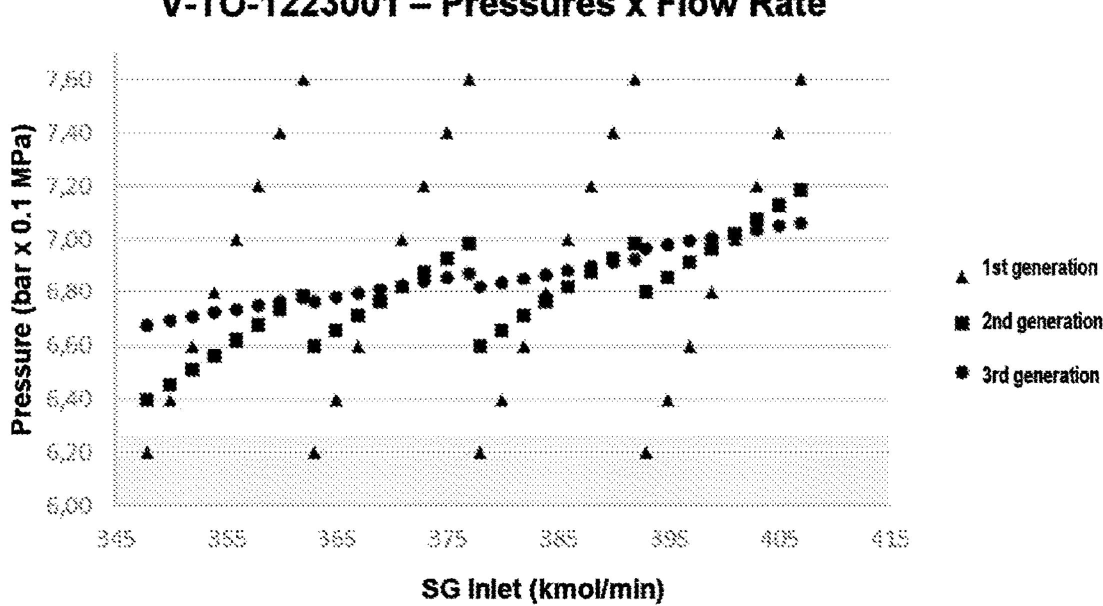
FIG. 6 illustrates a graph of pressure per flow rate per generation, according to an example of application of the method of the present invention, according to a preferred embodiment thereof.
Figure 7:
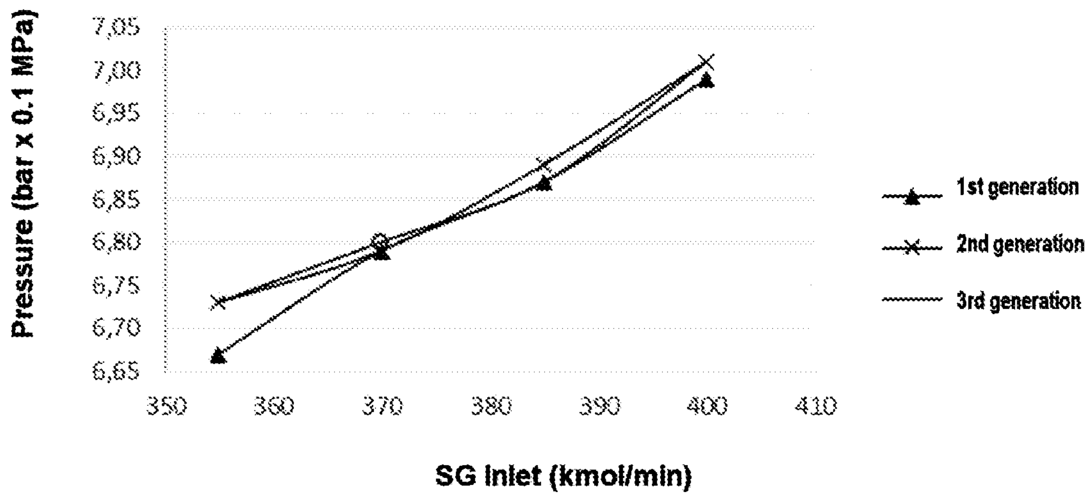
FIG. 7 shows a maximum pressure of gain per flow rate per generation for the highest result of the objective function, according to an example of application of the method of the present invention, according to a preferred embodiment thereof.
Figure 8:
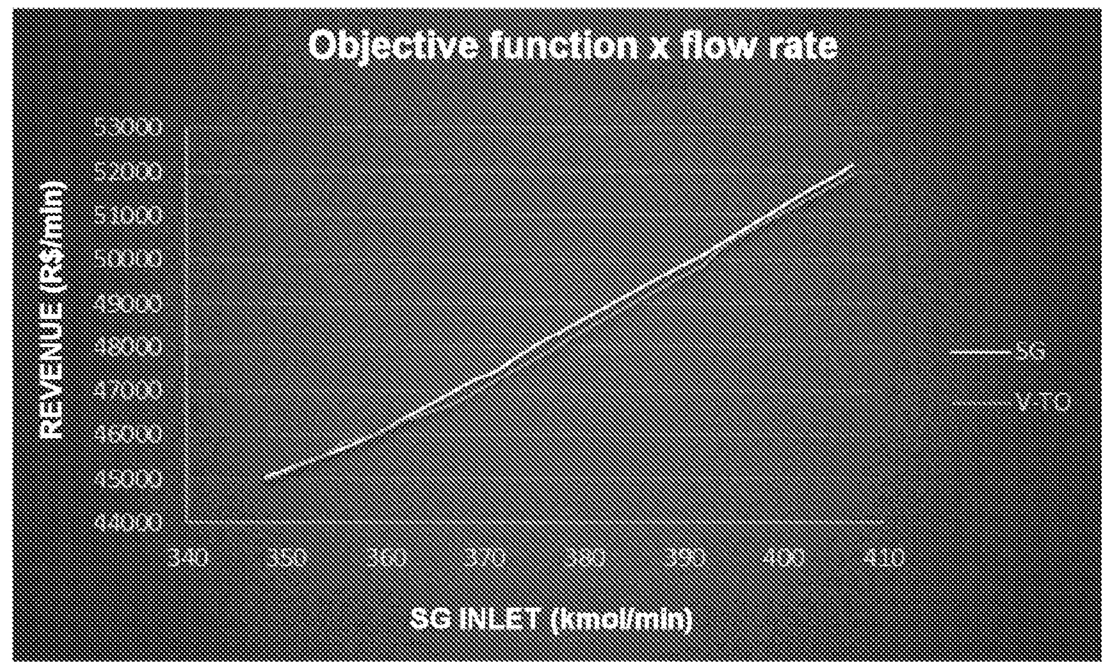
FIG. 8 presents the result of the objective function per flow rate for the optimal pressures, according to an example of application of the method of the present invention, according to a preferred embodiment thereof.

Analogously, all of the above was performed for V-TO-1223001, as seen in FIGS. 6, 7, and 8.

FIG. 6 illustrates a graph of pressure per flow rate per generation, according to an example of application of the method of the present invention, according to a preferred embodiment thereof.

FIG. 7 shows a maximum pressure of gain per flow rate per generation for the highest result of the objective function, according to an example of application of the method of the present invention, according to a preferred embodiment thereof.

FIG. 8 shows the result of the objective function by flow rate for the optimal pressures, according to an example of application of the method of the present invention, according to a preferred embodiment thereof.

Thus, the behavior of the V-TO-1223001 is similar to what was found for the SG, and the result of the objective function was a little lower, justified by the greater degree of depressurization that the fluid was in at this step.

It is worth emphasizing that in both cases, the non-linear behavior of the liquid-vapor equilibrium was observed to have little influence, since the pressure is far from the critical pressure, which is around 50 bar (5 MPa), and taking into account that the pressure range for analysis was only 1.4 bar (140 kPa).

With the two curves in FIG. 8 and their setpoint data, a fourth generation was prepared for analysis, now using the operating pressures that maximize the objective function for both equipment at the same time, to generate the final optimal revenue curve.

Figure 9:
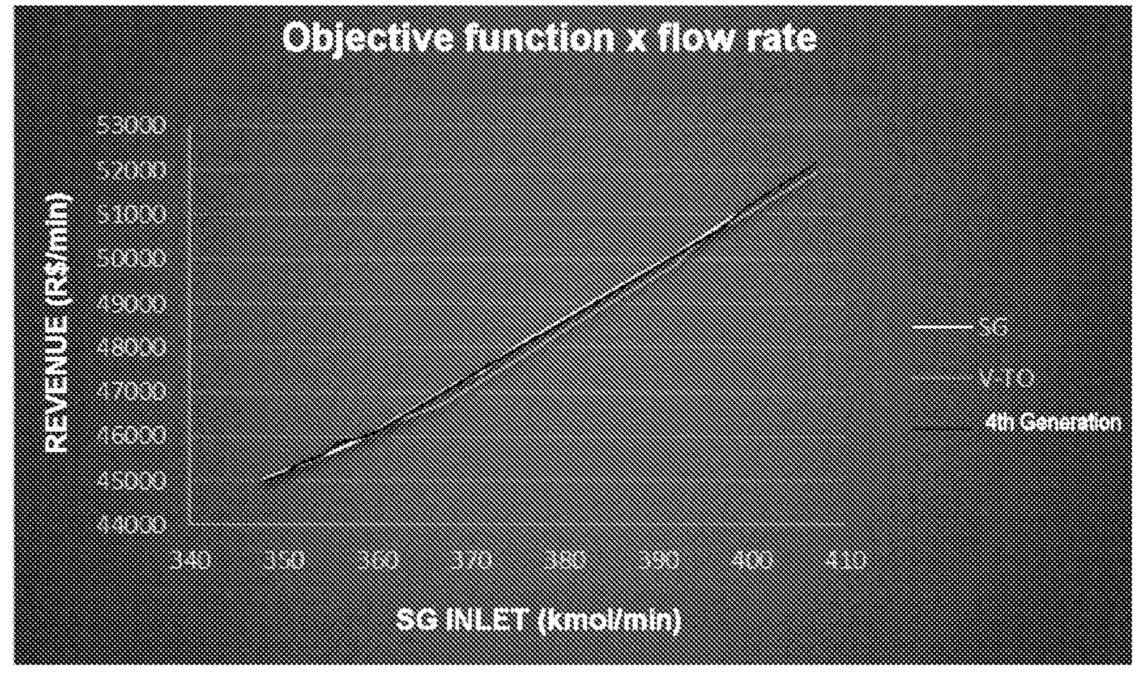
FIG. 9 represents the result of the objective function per flow rate for the optimal pressures in the fourth generation, according to an example of application of the method of the present invention, according to a preferred embodiment thereof.

Thus, it was possible to see the optimization of the objective function with the interaction between the vessels, as identified in FIG. 9. FIG. 9 represents the result of the objective function by flow rate for the optimal pressures in the fourth generation, according to an example of application of the method of the present invention, according to a preferred embodiment thereof.

With this, the optimal pressure setpoint control was performed.

Particularly, in parallel to the process of searching for the optimal operating point, a search mutation was performed with randomly created chromosomes, in order to calculate gain points, from the variation of pressures and flow rates, within the population space, and compared with the optimum found for the $4^{th}$ generation under analysis. As a result, no mutation points were found at maxima greater than those found in generational analyses, showing that it does not operate at a local maximum, but rather at a global maximum.

Consequently, it was possible to implant an expert setpoint and override control system for the process.

Figure 10:
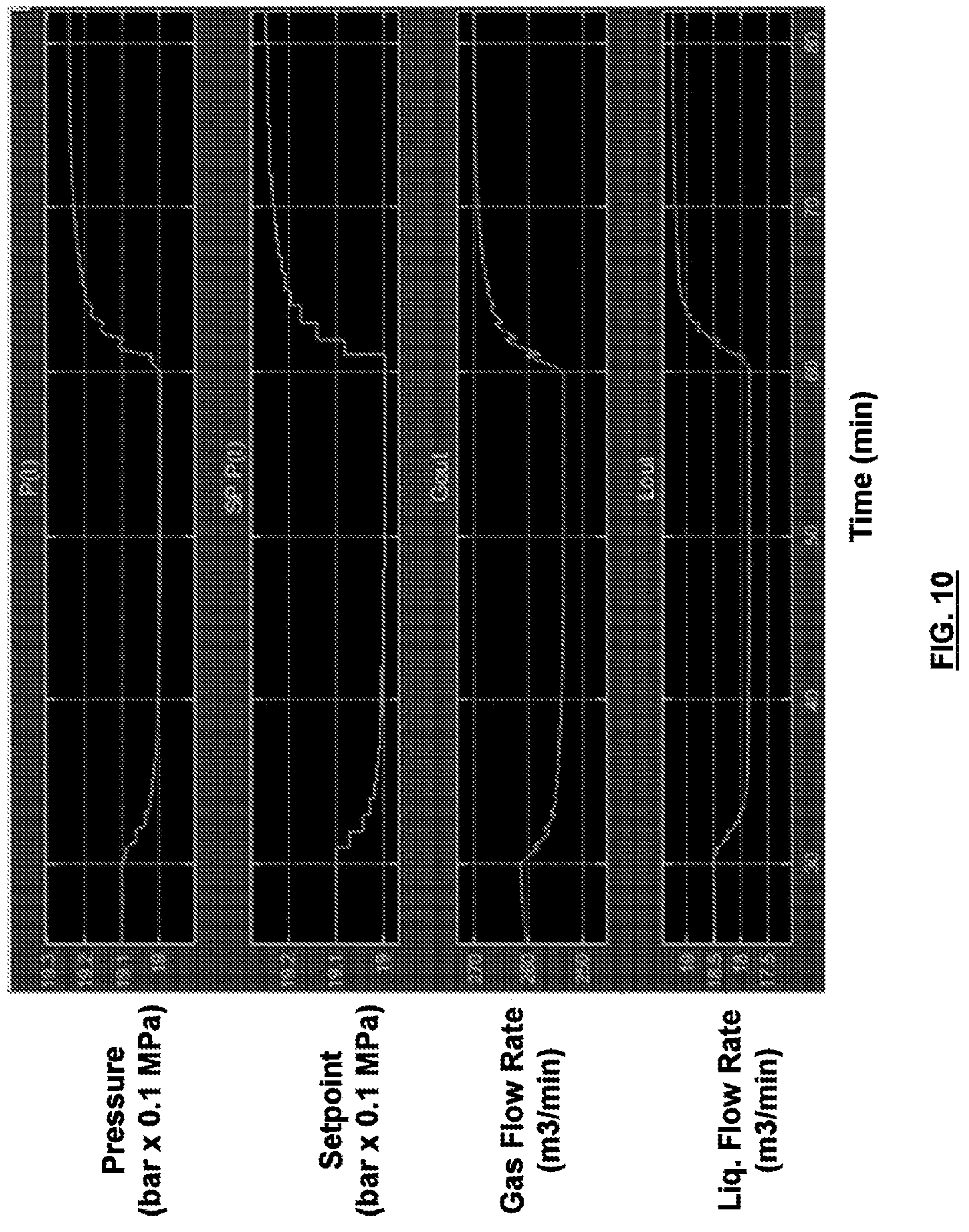
FIG. 10 presents graphs representing the automatic setpoint control in two disturbances in the gas and oil flow rates, according to an example of application of the method of the present invention, according to a preferred embodiment thereof.

FIG. 10 shows graphs representing the automatic setpoint control in two disturbances in the gas and oil flow rates, according to an example of application of the method of the present invention, according to a preferred embodiment thereof.

More specifically, FIG. 10 shows the automatic setpoint change for 3 different flow rates levels for the process in the SG.

Based on FIG. 10, a step-type disturbance is identified with a 4% reduction in production, at 30 minutes; followed by an 8% increase in SG input production at 60 minutes. Further, the setpoint switches between 19.1 bar (1.91 MPa), 19 bar (1.9 MPa) and 19.25 bar (1.925 MPa) automatically, according to the changes that occur in the flow rate. The process has a fixed setpoint of 19.3 bar (1.93 MPa), regardless of the flow rate. With the application of genetic algorithms with an expert system, it is possible to produce with an optimized revenue and obtain expressive gains.

Additionally, according to FIG. 10, the outlet flow rate of liquids (Lout) and gas (Gout) follows the control logic and the threshold imposed by the variation in the process input, but with a slight change based on the setpoint control thereby optimizing the revenue.

The expert system provides override control, thus implementing the SIS in the process.

Figure 11:
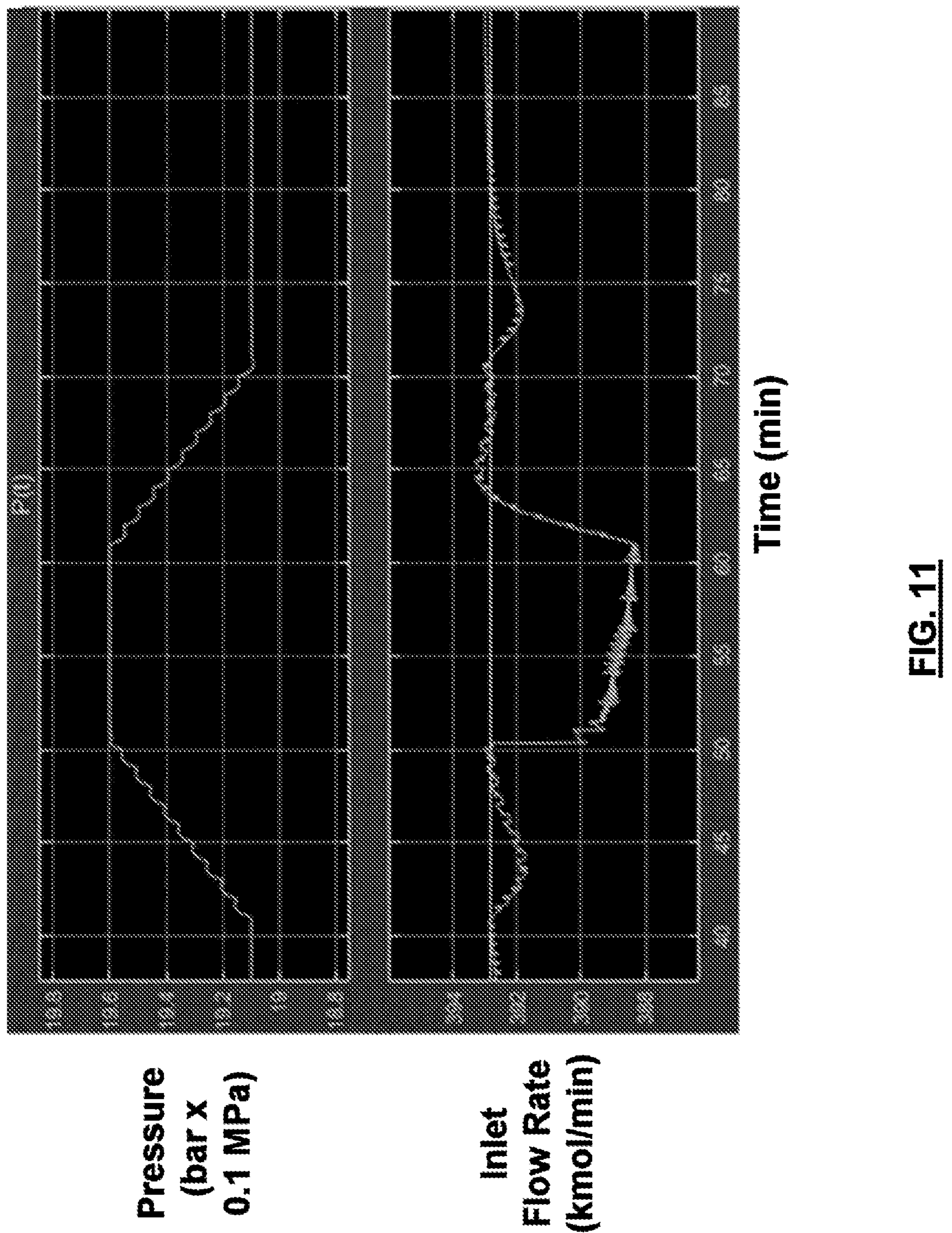
FIG. 11 shows graphs representing the performance of the override control upon reaching the limit pressure, according to an example of application of the method of the present invention, according to a preferred embodiment thereof.

FIG. 11 shows graphs representing the performance of the override control upon reaching the limit pressure, according to an example of application of the method of the present invention, according to a preferred embodiment thereof.

More specifically, in FIG. 11, two tests are displayed; one of them causes a disturbance in the operating pressure that makes it reach the pressure limit established for the SIS, 19.6 bar (1.96 MPa), thus activating the override control of plant feeding flow rate, via neuro-fuzzy logic. The neuro-fuzzy logic reduces the flow rate so that the pressure is not high, despite having been programmed a disturbance that takes the pressure up to 20 bar (2.0 MPa) and until the pressure reduction occurs and with that the return to process stability.

In addition, according to FIG. 11, it is possible to note that the flow rate control acts right at the beginning of the process to provide the return of the flow rate to the setpoint, even with the increase in the pressure in ramp, because the feeding flow rate decreases with increasing pressure, naturally. However, when this pressure reaches the limit established by the SIS, the flow rate suffers a more significant reduction in order to remove the process from the limit region. Furthermore, when the pressure is reduced below the limit, the flow rate returns again to the normal process setpoint, given that the instability has already been overcome.

Figure 12:
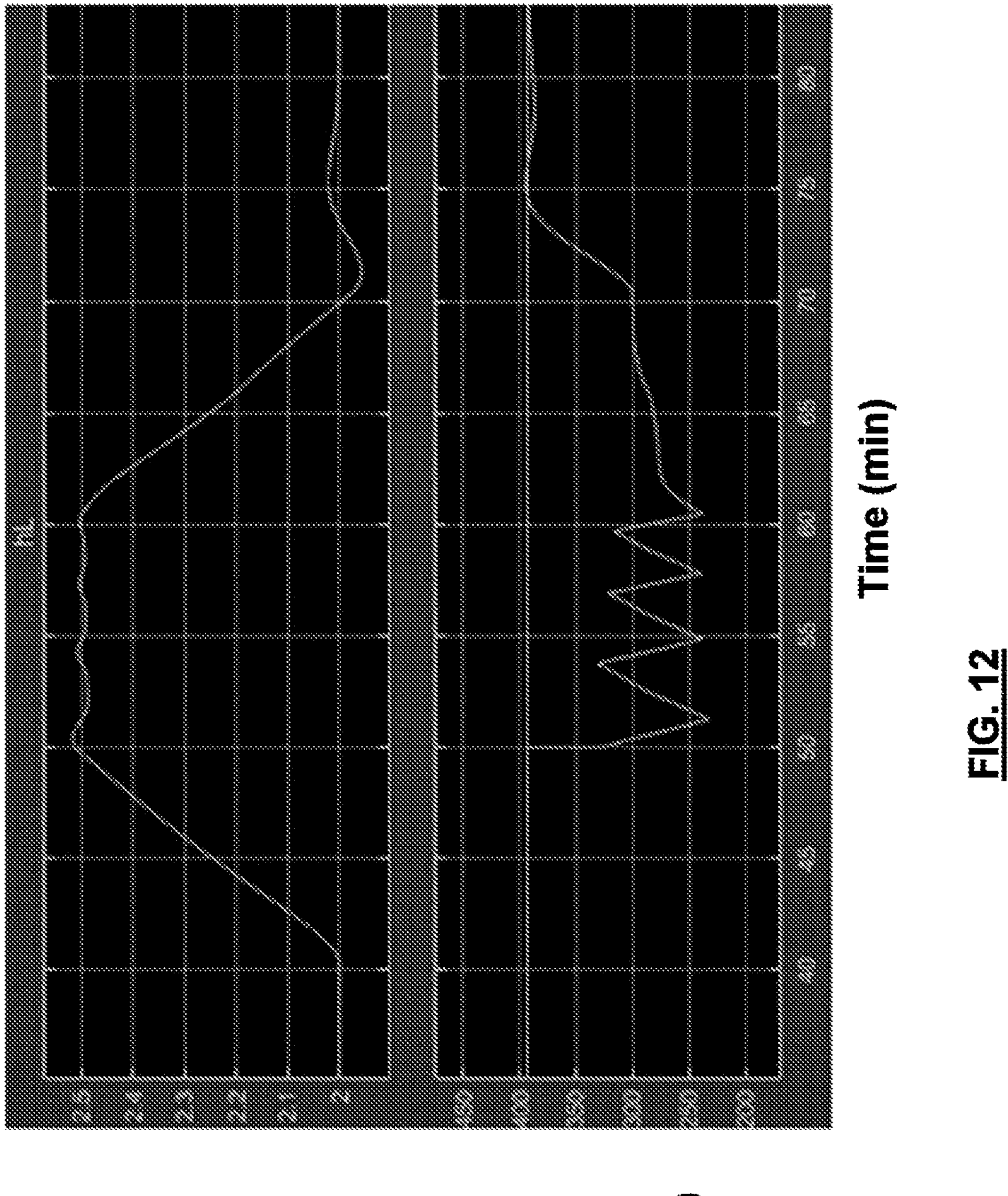
FIG. 12 illustrates graphs that present the performance of the override control when reaching the limit level, according to an example of application of the method of the present invention, according to a preferred embodiment thereof.

FIG. 12 illustrates graphs showing the performance of the override control upon reaching the limit level, according to an example of application of the method of the present invention, according to a preferred embodiment thereof.

Specifically, FIG. 12 illustrates the operation of the flow rate override control due to the elevation of the level in the vessel, where the flow rate is reduced when reaching the established limit of 2.5 m of level, despite having been programmed that reached 2.8 m, where it can be seen that the level decreases with the reduction of the flow rate. Then, the flow rate returns to the normal control and tends to normalize, but the level increases again. Subsequently, the limit is reached again. Finally, it is possible to observe that the activation of the override control occurs 4 times until the nominal flow rate is reached with the normal level.

The algorithm for controlling the setpoint and override of the plant is presented below. The proposed algorithm, according to the example presented here, has at least 36 rules for the presented process, but does not require a high computational effort, since it is composed of simple rules.

If {(P1(t))} is lower than {(upper limit)} and greater than {(lower limit)}, then ENABLE {(setpoint control by Genetic Algorithm f(x))};

If {(P1(t))} is greater than the limit, then ENABLE {(flow rate override control)} and DISABLE {(setpoint control by Genetic Algorithm f(x))};

If {(P1(t))} is lower than {(lower limit)}, then ENABLE {(flow rate override control)} and DISABLE {(setpoint control by Genetic Algorithm f(x))};

If {(Level(t))} is lower than {(upper limit)} and greater than {(lower limit)}, then ENABLE {(setpoint control by Genetic Algorithm f(x))};

If {(Level1(t))} is greater than the limit, then ENABLE {(flow rate override control)} and DISABLE {(setpoint control by Genetic Algorithm f(x))};

If {(Level(t))} is lower than {(lower limit)}, then ENABLE {(flow rate override control)} and DISABLE {(setpoint control by Genetic Algorithm f(x))};

Those skilled in the art will value the knowledge presented herein and will be able to reproduce the invention in the presented embodiments and in other variants, encompassed in the scope of the attached claim

The invention claimed is:

1. A method for controlling a separation and treatment plant, the method comprising:

defining an objective function of a separation and treatment plant for industrial processes without chemical reaction;

delimiting the separation and treatment plant by:

defining the boundary conditions of the objective function;

identifying models of a process for a dynamic and static evaluation of the process based on the objective function; and identifying processes to use neural networks or deep learning networks to create a behavior model of each process;

evaluating a steady state of the separation and treatment plant;

evaluating a dynamic state of the separation and treatment plant; and performing a non-linear dynamic simulation of the separation and treatment plant, wherein evaluating the dynamic state of the separation and treatment plant comprises:

evaluating a stability of one or more control loops according to a Routh-Hurwitz or Ultimate-Gain criteria;

evaluating a performance of the one or more control loops based on an analysis criteria of error integrals and deviation in relation to plant restrictions;

generating and evaluating one or more candidate setpoints for maximum production points using genetic algorithms;

modifying necessary controls to operate in ranges defined by the genetic algorithms; and reviewing the one or more control loops and implementing the one or more control loops.

2. The method of claim 1, wherein the objective function of the separation and treatment plant comprises characteristics including one or more of processes, equipment, products and inputs of the separation and treatment plant.

3. The method of claim 2, wherein the objective function is a production quantity.

4. The method of claim 1, wherein the boundary conditions comprise one or more of: degrees of freedom, restrictions, limits, and expected conditions of the separation and treatment plant.

5. The method of claim 1, further comprising obtaining the boundary conditions of the objective function from handbooks of plant equipment manufacturers and from technical information of similar plants in operation.

6. The method of claim 4, further comprising determining the degrees of freedom as a function of process models and variables obtained from the process of the separation and treatment plant.

7. The method of claim 1, wherein evaluating the steady state of the separation and treatment plant comprises:

defining one or more variables to be controlled; and evaluating a productivity and a sensitivity of the one or more variables to be controlled against a production performed for each condition foreseen in the process.

8. The method of claim 7, wherein evaluating the steady state of the separation and treatment plant further comprises evaluating the sensitivity of the one or more variables to be controlled by implementation of the one or more control loops.

9. The method of claim 1, wherein performing the non-linear dynamic simulation of the separation and treatment plant comprises evaluating the one or more candidate setpoints for maximizing the objective function without reaching a limits of the process.

* * * * *